United States Patent
Yeom et al.

(10) Patent No.: US 10,146,842 B2
(45) Date of Patent: Dec. 4, 2018

(54) PRE-INSTANTIATING NATIVE APPLICATIONS IN BACKGROUND

(71) Applicant: Google LLC, Mountain View, CA (US)

(72) Inventors: Jaehyun Yeom, Mountain View, CA (US); Dong Ha Lee, Palo Alto, CA (US); Jongho Choy, San Jose, CA (US)

(73) Assignee: Google LLC, Mountain View, CA (US)

( * ) Notice: Subject to any disclaimer, the term of this patent is extended or adjusted under 35 U.S.C. 154(b) by 399 days.

(21) Appl. No.: 14/945,703

(22) Filed: Nov. 19, 2015

(65) Prior Publication Data

US 2017/0147658 A1 May 25, 2017

(51) Int. Cl.
| | | |
|---|---|---|
| *G06F 17/30* | (2006.01) | |
| *G06F 3/0484* | (2013.01) | |
| *G06F 17/22* | (2006.01) | |
| *G06F 9/445* | (2018.01) | |
| *G06F 9/48* | (2006.01) | |

(52) U.S. Cl.
CPC .... *G06F 17/30554* (2013.01); *G06F 3/04842* (2013.01); *G06F 9/445* (2013.01); *G06F 9/44594* (2013.01); *G06F 9/485* (2013.01); *G06F 17/2235* (2013.01); *G06F 17/3053* (2013.01); *G06F 17/30477* (2013.01); *G06F 17/30867* (2013.01)

(58) Field of Classification Search
CPC ........... G06F 17/30554; G06F 3/04842; G06F 9/445; G06F 9/44594; G06F 9/485; G06F 17/2235; G06F 17/30477; G06F 17/3053; G06F 17/30867
See application file for complete search history.

(56) References Cited

U.S. PATENT DOCUMENTS

| | | | | |
|---|---|---|---|---|
| 8,595,450 B2 * | 11/2013 | Nguyen | ................. | G06F 9/445 711/100 |
| 8,886,644 B1 * | 11/2014 | Stracke, Jr. | ....... | G06F 17/30867 707/706 |
| 2008/0005190 A1 * | 1/2008 | Fey | ........................... | G06F 8/60 |

(Continued)

FOREIGN PATENT DOCUMENTS

| | | |
|---|---|---|
| JP | 2015-506617 | 3/2015 |
| WO | 2014/200547 | 12/2014 |

OTHER PUBLICATIONS

International Search Report and Written Opinion in International Application No. PCT/US2016/062051, dated Feb. 3, 2017, 12 pages.

(Continued)

*Primary Examiner* — Jared M Bibbee
(74) *Attorney, Agent, or Firm* — Fish & Richardson P.C.

(57) ABSTRACT

Methods, systems, and apparatus, for selecting one or more native application deep links from search results and instantiating, for each native application deep link that is selected, a background instance of the native application to which the native application deep link corresponds; determining, in response to an occurrence of a background unload event, background instances of the native applications instantiated from the native application deep links and that were not brought to the foreground prior to the occurrence of the background unload event; and terminating each of the background instances of the native applications instantiated that were not brought to the foreground prior to the occurrence of the background unload event.

20 Claims, 3 Drawing Sheets

(56) References Cited

U.S. PATENT DOCUMENTS

| | | | |
|---|---|---|---|
| 2009/0193009 A1* | 7/2009 | Naick | G06F 17/30867 |
| 2012/0323898 A1* | 12/2012 | Kumar | G06F 17/30899 |
| | | | 707/723 |
| 2012/0324481 A1 | 12/2012 | Xia et al. | |
| 2013/0173513 A1 | 7/2013 | Chu et al. | |
| 2014/0040226 A1 | 2/2014 | Sadhukha et al. | |
| 2014/0358970 A1* | 12/2014 | Morris | G06F 17/30392 |
| | | | 707/772 |
| 2015/0046434 A1* | 2/2015 | Lim | G06F 17/3097 |
| | | | 707/722 |
| 2015/0242422 A1* | 8/2015 | Shapira | G06Q 30/0282 |
| | | | 707/722 |
| 2015/0242510 A1* | 8/2015 | Shapira | G06F 17/30392 |
| | | | 707/706 |

OTHER PUBLICATIONS

Parate et al. "Practical prediction and prefetch for faster access to applications on mobile phones," Proceedings of the 2013 ACM International Joint Conference on Pervasive and Ubiquitous computing. ACM, Sep. 8, 2013, 10 pages.

Yan et al., "Fast App Launching for Mobile Devices Using Predictive User Context," MobiSys'12 Proceedings of the 10th international conference on Mobile systems, applications, and services, Jun. 2012, pp. 113-126.

\* cited by examiner

PRE-INSTANTIATING NATIVE APPLICATIONS IN BACKGROUND

BACKGROUND

The Internet provides access to a wide variety of information. For example, digital image files, video and/or audio files, as well as web page resources for particular subjects or particular news articles, are accessible over the Internet.

Furthermore, with the advent of tablet computers and smart phones, native applications that facilitate the performance of the same functions facilitated by the use of web page resources are now being provided in large numbers. Additionally, native applications that do not have websites with such synchronous content, such as games and other applications, are also very popular on tablet computers and smart phones. Accordingly, search systems now also facilitate searching of these native applications.

One process by which search systems gather information for native applications is by accessing "deep links" for the native applications. A deep link is an instruction specifying a particular environment instance of a native application and configured to cause the native application to instantiate the environment instance of the specified native application when selected at a user device. The native application generates the environment instance for display within the native application on a user device.

SUMMARY

This specification describes technologies relating to pre-instantiate native applications in the background when a deep link to the pre-instantiate native applications are present in a set of search results.

In general, one innovative aspect of the subject matter described in this specification can be embodied in a method that includes the action of receiving a set of search results, wherein the set includes search results that each include a native application deep link that instantiates an instance of a native application, wherein a native application generates environment instances for display on a user device within the native application, and the native application operates independent of a browser application that operates on the user device; selecting, prior to a user selection of a search result, native application deep links from the search results; instantiating, for each native application deep link that is selected, a background instance of the native application to which the native application deep link corresponds; determining, in response to an occurrence of a background unload event, background instances of the native applications instantiated from the native application deep links and that were not brought to the foreground prior to the occurrence of the background unload event; and terminating each of the background instances of the native applications instantiated that were not brought to the foreground prior to the occurrence of the background unload event. Other embodiments of this aspect include corresponding systems, apparatus, and computer programs, configured to perform the actions of the methods, encoded on computer storage devices.

Particular embodiments of the subject matter described in this specification can be implemented so as to realize one or more of the following advantages. The present system enables a background pre-instantiation of a native application. The background pre-instantiation occurs without distracting or disturbing a user's ability to utilize a user device. The pre-instantiation of the native application reduces latency time for a user when a user selects a deep link corresponding to a particular native application. Furthermore, the automated terminating of pre-instantiated native applications for native application search results there were not selected automatically frees user device resources without user intervention. Thus, the reduced latency that occurs when a user selects a native application search result for which an application is pre-instantiated does not come with the attendant cost of leaving a number of native applications instantiated in the background after the user navigates away from a search environment.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

A system receives a set of search results that are responsive to a search query. Within the set of search results are deep links. The system recognizes the presence of the deep links and pre-instantiates the native applications, which correspond to each deep link within the search results, in the background of a user device. As used herein, a native application generates environment instances for display on a user device within an environment of the native application, and operates independent of a browser application on the user device. A native application is an application specifically designed to run on a particular user device operating system and machine firmware. Native applications thus differ from browser-based applications and browser-rendered resources. The latter require all, or at least some, elements or instructions downloaded from a web server each time they are instantiated or rendered. Furthermore, browser-based applications and browser-rendered resources can be processed by all web-capable mobile devices within the browser and thus are not operating system specific.

A deep link is an instruction specifying a particular environment instance of a native application and configured to cause the native application to instantiate the environment instance of the specified native application when selected at a user device. The native application generates the environment instance for display within the native application on a user device. For example, a deep link may specify a selection menu for a game environment; or content from a website, such as a news site, forum, and the like; or a particular recipe for a cooking application; and the like.

The system and methods in this specification perform a pre-instantiation of an environmental instance of a native application to reduce latency time for users who wish to open the native application. In an implementation, the system, in response to receiving a set of search results that includes one or more deep links, identifies the one or more deep links present in the search results, and prelaunches or pre-instantiates the environmental instance for the native applications that correspond the one or more deep links. When the native application is pre-instantiated, it is launched in the background of the user device such that a user does not notice the pre-instantiation.

In some implementations, when a user selects a deep link from the search results, the pre-instantiated environmental instance of the native application is brought to the foreground and any other pre-instantiated environmental instances are terminated. In other implementations, if the system initiates an unload event, all pre-instantiated environmental instances of the native applications are terminated.

These features and additional features are described in more detail below.

Figure 1A:
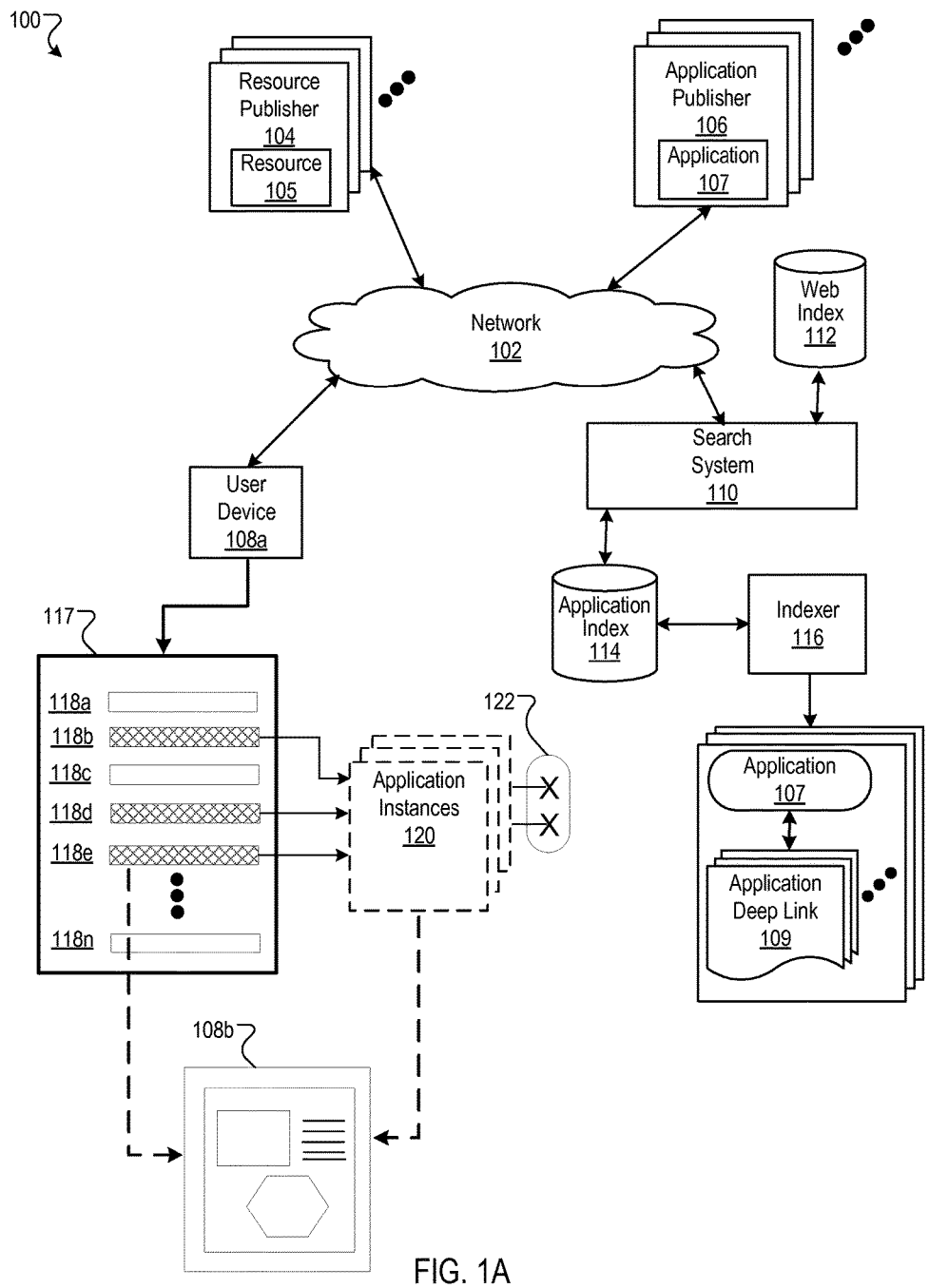
FIG. 1A is a block diagram of an example environment in which native applications are instantiated in the background and brought to the foreground.

FIG. 1A is a block diagram of an example environment 100 in which native applications are instantiated in the background and brought to the foreground. A computer network 102, such as the Internet, connects resource publisher web sites 104, application publishers 106, user devices 108 and a search system 110.

A resource publisher website 104 includes one or more web resources 105 associated with a domain and hosted by one or more servers in one or more locations. Generally, a resource publisher website is a collection of web pages formatted in hypertext markup language (HTML) that can contain text, images, multimedia content, and programming elements. Each website 104 is maintained by a content publisher, which is an entity that controls, manages and/or owns the website 104.

A web page resource is any data that can be provided by a publisher website 104 over the network 102 and that has a resource address, e.g., a uniform resource locator (URL). Web resources may be HTML pages, images files, video files, audio files, and feed sources, to name just a few. The resources may include embedded information, e.g., meta information and hyperlinks, and/or embedded instructions, e.g., client-side scripts.

An application publisher website 106 may also include one or more web resources 105, and also provides native applications 107. As described above, a native application 107 is an application specifically designed to run on a particular user device operating system and machine firmware. As used in this specification, an "environment instance" is a display environment within a native application and in which is displayed content, such as text, images, and the like. An environment instance is specific to the particular native application, and the native application is specific to the particular operating system of the user device 108a. An environment instance differs from a rendered web resource in that the environment instance is generated within and specific to the native application, while a web resource may be rendered in any browser for which the web page resource is compatible, and is independent of the operating system of the user device.

A user device 108a is an electronic device that is under the control of a user. A user device 108a is typically capable of requesting and receiving web page resources 105 and native applications 107 over the network 102. Example user devices 108a include personal computers, mobile communication devices, and tablet computers.

To search web resources 105 and the native applications 107, the search system 110 accesses a web index 112 and an application index 114. The web index 112 is an index of web resources 105 that has, for example, been built from crawling the publisher web sites 104. The application index 114 is an index of environment instances for native applications 107, and is constructed using an indexer 114 that receives data crawled from an application instance 122 of a native application. Although shown as separate indexes, the web index 112 and the application index 114 can be combined in a single index.

The user device 108a submits search queries to the search system 110. In response to each query, the search system 110 accesses the web index 112 and the application index 114 to respectively identify resources and applications that are relevant to the query. The search system 110 may, for example, identify the resources and applications in the form of web resource search results and native application search results, respectively. Once generated, the search results are provided to the user device 108a from which the query was received.

A web resource search result is data generated by the search system 110 that identifies a web resource and provides information that satisfies a particular search query. A web resource search result for a resource can include a web page title, a snippet of text extracted from the resource, and a resource locator for the resource, e.g., the URL of a web page. A native application search result specifies a native application and is generated in response to a search of the application index 114 of environment instances. A native application search results includes a "deep link" specifying a particular environment instance of the native application and which is configured to cause the native application to instantiate the specified environmental instance. For example, selection of a native application search result may cause the native application to launch (if installed on the user device 108) and generate an environment instance referenced in the application search result in the form of a screen shot.

As described above, publishers 106 that provide native applications 107 also provide deep links to the search system 110. Furthermore, third parties may also provide deep links for native applications. Additionally, the search system 110 can discover deep links from other multiple sources, such as app maps, web page annotations, etc., and thus the set of deep links may be constantly changing. For example, an application publisher may provide a list of deep links 109 in the form of uniform resource identifiers (URIs) (or other instruction types that are specific to the native application published by the publisher). These deep links are deep links that publisher 106 desires to be crawled and indexed in the application index 114.

A deep link may specify a name of a native application, and may include optional parameters, e.g., <app_name>://<params>. These optional parameters may cause the native application to instantiate at a certain state, such as a particular screen, menu or environment within the native application. For example, for the native application "Example_App", a deep link to simply launch the native application may be the application name without parameter:

Example_App://

However, should a native application search result specify certain information or a particular state for the native application, the certain information or particular state may be specified by parameters. For example, for the application to instantiate at a for a certain news story with a unique ID News12345, the deep link may be:

Example_App://News12345

A user can submit a search query on a user device 108a that will return a search results page 117 that may contain web resource search results 118a, 118c, and 118n, and native application search results 118b, 118d, and 118e. The system detects the deep links within the native application search results 118*b*, 118*d* and 118*e* that are presented on the search results page 117 and begins pre-instantiates native applications 120 that correspond to native application search results 118*b*, 118*d*, and 118*e* in the background of the user device 108*a*. In some implementations, the background pre-instantiated native application instance 120 does not have an active viewport for a user to see or engage with. Thus, while the native application 107 is launched and running, it is instantiated in such a way that the user does not notice the native application is running.

Figure 1B:
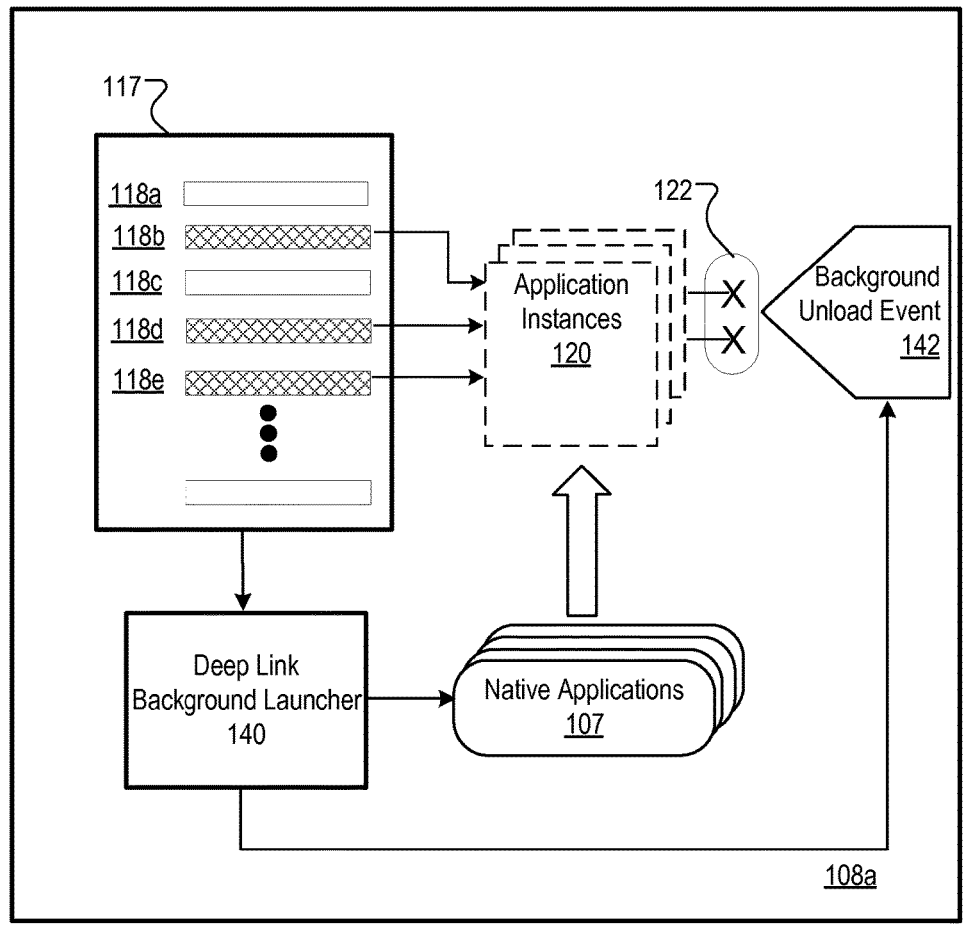
FIG. 1B is a block diagram of a user device that is configured to pre-instantiate native applications from native application search results.

FIG. 1B is a block diagram of a user device 108*a* that is configured to pre-instantiate native applications from native application search results. The operating system of the user device 117, in some implementations, is configured to launch the native applications detected in the deep links in a manner so that they are launched in the background. For example, instructions that define a deep link background launcher 140 may be included in the operating system. Alternatively, the instructions for the deep link background launcher 140 can be realized by another native application that a user launches to process native application search results as described below. In yet other implementations, the instructions for the deep link background launcher 140 can be included with any search results page or resource that includes a native application deep link. In still other implementations, the launcher 140 can be realized in the search system 110, and is configured to modify the deep links when necessary to cause the user device 108*a* to pre-instantiate the native application upon processing the deep link.

As will be described below, the deep link background launcher 140 is configured to determine when to pre-instantiate native applications, which deep links to process to pre-instantiate native applications, and when to terminate native applications that have been pre-instantiated.

In some implementations, a background launch can be done by appending a command line parameter to the deep-link and then processing the deep link, e.g., Example_App://News12345&-bg Where "-bg" is a command line parameter that causes the native application to be launched in the background. Other processes to launch a native application in the background may also be used.

In some implementations, a number of native applications 107 that are pre-instantiated is determined based on constraints. For example, the number of pre-instantiated native application instances 120 can depend on the amount of available system resources to preclude over-utilization the user device's resources (e.g., RAM, drive space, processing capability, etc.).

In addition, the deep link background launcher 140 can limit the number of active pre-instantiated native application instances based on a ranking threshold. For example, the ranking threshold may be based on a minimum ordinal position of a deep link within the search results. To illustrate, assume a ranking threshold is an ordinal position of 5. Any native application search result in ordinal positions 1-5 will thus be selected for pre-instantiation, and any at an ordinal position greater than 5 will not be selected. The deep link background launcher 140, prior to a user selection of a search result, selects native application deep links from the native application search results 118*b*, 118*d*, and 118*e*, as their ordinal positions are 2, 4, and 5, respectively. Thus, any native application search results in a highest ranked proper subset of search results 117 that meet the ranking threshold will be selected for pre-instantiation.

In some implementations, the ranking threshold can be based on user behavior signals for the native applications. The user behavior signals, for example, can specify how probable it is that a user may click a deep link based on time of the day, the day, and other predictive variables. Thus, the system may choose to limit the number of pre-instantiated native application instances 120 to only those with deep links that the user will most likely select. The search system 110 may access user history data to determine a probability for each deep link and provide the probability to the deep link background launcher.

In other implementations, the ranking threshold is based on a minimum relevance score for a search query. The search system may generate a relevance score for a deep link based on how relevant the deep link is to the search query. A relevance score may be determined by the number of times a deep link is clicked in response to a similar search query, a measure of relevance of the terms to the native application, or any other relevance scoring mechanism. The relevance score may be provided to the deep link background launcher 140 for the launcher 140 to make the determination.

The launcher 140 selects which native application 107 to pre-instantiate based on the selected corresponding deep links within the search results page 117. In some implementations, the launcher 140 sends to the user device operation system a "start" event with a unique identifier and an expiration time to pre-instantiate the native application instances in the background. The expiration time is a pre-defined time applied to the pre-instantiated native application 120 defining an amount of time the pre-instantiated native application 120 runs without user interaction before terminating 122 the pre-instantiated native application instance 120. Further details regarding the expiration time and terminating 122 the pre-instantiated native application instance are provided below.

In some implementations, for each selected deep link that is pre-instantiated, a unique identifier is generated that corresponds to the particular instance of the native application 107 and the corresponding deep link. In some implementations, the unique identifier is generated by applying a hash function to the deep link. For example, the hash function can be applied to a native application identity and a uniform resource indicator. The launcher pre-instantiates the background instance of the native application using the unique identifier to identify each active instantiation. Upon a user selection of a native application search result with a deep link, the launcher 140 receives the selection and determines whether the native application 107 to which the native application deep link corresponds has been instantiated in a background native application instance 120. If the native application 107 has been instantiated in the background, the selection of deep link causes the native application instantiated 120 in the background instance to transition to a foreground instance on the user device 108*b*. A foreground instance of native application 107 has an active viewport that is viewable and can readily be interacted with by the user. Because the native application has been pre-instantiated, the transition to the foreground occurs with much less latency than there would be when the native application is launched after the user selection.

The system sends an "open" event with the unique identifier to cause the native application to transition to the foreground instance. If a native application with the same unique identifier is not pre-instantiated in the background, the native application is opened by launching the native application.

In some implementations, a background unload event can occur at the expiration of a timeout period measured from the instantiation of the native application background instances 120. For example, pre-instantiated native application instances 120 that are not brought to the foreground are terminated 122 when the launcher 140 generates sends an "unload" event accompanied with corresponding unique identifiers to the native applications 107 that have active pre-instantiated instances 120. There are various implementations that can cause the system to send an "unload" event to a native application 107. For example, if a user does not interact with a deep link within the expiration time that was sent with a "start" event for a particular pre-instantiated native application instance 120, a timer for the pre-instantiated native application instance 120 expires and the launcher 140 generates the background unload event 142. This causes terminations 122 of the native applications 107.

In other implementations, the background "unload" event occurs upon the unloading of a page in which the set of search results 117 are displayed. A page may be "unloaded" when a new set of search results for a search are requested, when a particular deep link is selected, or when the page is closed, for example. For example, upon a user selection of a particular deep link, the "open" event for the particular native application is generated by the launcher 140, and an "unload" event is sent to the launcher 140 for any other active pre-instantiated native application instances 120 not associated with the particular deep link selected by the user. Thus, as the native application is brought to the foreground, the other active pre-instantiated native applications 120 are terminated 122.

Similarly, if a user navigates away from the search results page, an "unload" event is generated by the launcher 140 for all active pre-instantiated native application instances 120 to terminate 122 the instances.

In some implementations, a particular native application may support pre-instantiating multiple native application instances 120, and the launcher 140 may pre-instantiate multiple native application instances 120 for the particular native application 107. Each instance may launch to a different portion of the native application 107 based on the unique deep link used to launch the instance. For example, for three different deep links with different parameters for a particular native application, one native application instance 120 may launch to a main menu, another instance 120 of the native application may launch to a sub-menu, and another instance 120 may launch to an editing environment within the native application.

The unique identifiers for the instances of the native applications 107 can also be used to determine which instances to terminate. When a native application is pre-instantiated, its corresponding unique identifier is stored in memory by the operating system. Thereafter, when a native application that has been pre-instantiated is brought to the foreground, its corresponding unique identifier is removed from the memory. When the background unload signal is generated, any instances of native applications that were pre-instantiated and that still have unique identifier stored in the memory are terminated.

In the example where a native application 107 can support multiple native application instances 120, the launcher 140 associates a unique identifier for each instance 120. Thus, for each native application that supports multiple instances of the native application, the launcher 140 associates each of the created unique identifiers with a corresponding unique instance of the native application. This enables the launcher 140 to bring the correct native application instance 120 to the foreground when a user selects a particular deep link. Therefore, causing the native application instantiated in the background instance to transition to a foreground instance requires causing only the unique instance of the native application to transition to the foreground instance by using that unique instance's particular unique identifier with the "open" event. This also allows the system to determine which pre-instantiated native application instances were not brought to the foreground before the background unload event occurs and to terminate those pre-instantiated native applications. Finally, the use of the unique identifiers for each instantiation allows the system to ignore any instances of a native application that was loaded and in the background prior to the search operation. For example, a native application instance that was minimized by the user prior to a search will not be terminated if another instance of the native application is pre-instantiated in response to a native application deep link being provided in response to a search operation but not brought to the foreground before the background unload event occurs.

When a particular native application only supports a single instance of a native application on a user device, and multiple deep links for a particular native application are in the search results, the launcher 140 selects only a single native application deep link for that native application. For example, with reference to FIG. 1B, assume native application search results 118b and 118d both have deep links to a chess program. The first deep link for the search result 118b links to an opening book environment within the native application, and the second deep link for the search result 118d links to a game selection menu within the native application. Because the search result 118b is ranked above the search result 118d, the native application is pre-instantiated to the opening book environment, and the deep link for the search result 118d is not processed.

The deep link background launcher 140 can be provided with data that describes which native applications support multiple instances and which support only single instances. For example, the search engine 110 may provide a file that describes the capabilities of the native applications to support multiple instances. Using this information, the launcher 140 can then process the deep links as described above.

Although pre-instantiation of native application instances has been discussed with regards to search query and search results responsive to a search query, pre-instantiation of native application instances can occur within in any resource that contains an application deep link 109. The launcher 140 can pre-instantiate a native application instance upon detection of any native application deep link 109. For example, within a movie review application, there may be a movie watch, movie theater location, and/or movie trailer deep link present. The launcher 140 can pre-instantiate one or all of the native applications corresponding to the deep links 109 present within the movie review application.

Figure 2:
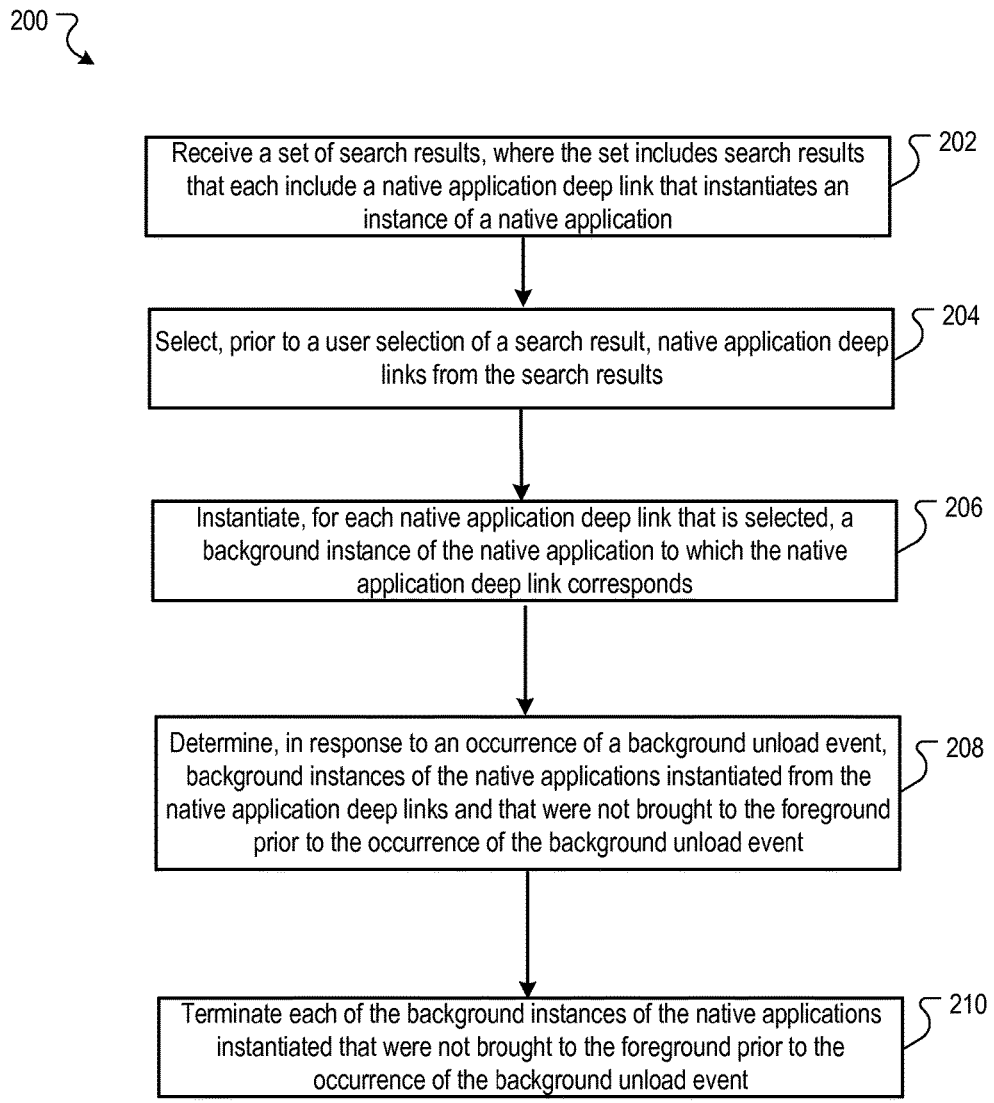
FIG. 2 is a flow diagram describing a process for instantiating background instances of native applications.

FIG. 2 is a flow diagram describing a process 200 for instantiating background instances of native applications. The process 200 can be implemented on a user device 108. The process 200 receives a set of search results responsive to a search query (202). The set of search results include search results that each include a native application deep link 109 that, when engaged with, instantiates an instance of a native application 107. In addition, a native application 107 generates environment instances for display on a user device within the native application, and the native application 107 operates independent of a browser application that operates on the user device.

The process 200 selects, prior to a user selection of a search result, native application deep links 109 from the search results (204). As previously described, the launcher 140 detects native application deep links 109 that are present within a set of search results and selects the deep links based on various constraints. Upon selection of the deep links, the launcher 140 instantiates, for each native application deep link that is selected, a background instance 120 of the native application to which the native application deep link 109 corresponds (206).

The process 200 determines, in response to an occurrence of a background unload event, background instances of the native applications instantiated from the native application deep links and that were not brought to the foreground prior to the occurrence of the background unload event (208). For example, if a pre-instantiated native application instance received an "open" event, that native application instance moves to the foreground in a viewport accessible by the user. For the other active pre-instantiated native application instances, the process 200 unloads each of the background instances of the native applications instantiated that were not brought to the foreground prior to the occurrence of the background unload event (210).

Additional Implementation Details

In situations in which the systems discussed here collect personal information about users, or may make use of personal information, the users may be provided with an opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus.

A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., a FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's user device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a user computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include users and servers. A user and server are generally remote from each other and typically interact through a communication network. The relationship of user and server arises by virtue of computer programs running on the respective computers and having a user-server relationship to each other. In some embodiments, a server transmits data (e.g., an HTML page) to a user device (e.g., for purposes of displaying data to and receiving user input from a user interacting with the user device). Data generated at the user device (e.g., a result of the user interaction) can be received from the user device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method performed by data processing apparatus, the method comprising:

receiving, at a user device, a set of search results, wherein the set includes one or more search results that each include a native application deep link that instantiates an instance of a native application, wherein a native application generates environment instances for display on the user device within the native application, and the native application operates independent of a browser application that operates on the user device;

selecting, by the user device and prior to a user selection of a search result, one or more native application deep links from the search results;

instantiating, by the user device and prior to a user selection of a search result, for each native application deep link that is selected, a background instance of the native application to which the native application deep link corresponds;

generating, by the user device, a background unload event;

determining, by the user device and in response to the generation of the background unload event, background instances of the native applications instantiated from the native application deep links and that were not brought to a foreground instance prior to the generation of the background unload event; and terminating, by the user device, each of the background instances of the native applications instantiated that were not brought to the foreground instance prior to the generation of the background unload event.

2. The computer-implemented method of claim 1, further comprising:

receiving a user selection of a search result with a native application deep link; and determining that the native application to which the native application deep link corresponds has been instantiated in a background instance, and in response causing the native application instantiated in a background instance to transition to a foreground instance.

3. The computer-implemented method of claim 2, further comprising:

generating, for each native application deep link a unique identifier that corresponds to the native application to which the native application deep link corresponds; and wherein instantiating, for each native application deep link that is selected, the background instance of the native application comprises instantiating the background instance using the unique identifier.

4. The computer-implemented method of claim 3, further comprising:

for each native application that support multiple instances of the native application, associate each unique identifier with a corresponding unique instance of the native application.

5. The computer-implemented method of claim 4, wherein causing the native application instantiated in the background instance to transition to a foreground instance comprises causing only the unique instance of the native application to transition to the foreground instance.

6. The method of claim 4, wherein selecting, prior to the user selection of a search result, native application deep links from the search results comprise selecting only a single native application deep link for a native application that supports only a single instance of the native application.

7. The method of claim 1, wherein selecting, prior to the user selection of a search result, native application deep links from the search results comprise selecting only a single native application deep link for a native application that supports only a single instance of the native application.

8. The method of claim 1, wherein selecting, prior to the user selection of a search result, native application deep links from the search results comprise selecting only native application deep links from a proper subset of search results, wherein each search result in the proper subset meets a ranking threshold.

9. The method of claim 8, wherein the ranking threshold is based on a minimum ordinal position of a search result.

10. The method of claim 8, wherein the ranking threshold is based on a minimum relevance score for a query.

11. The method of claim 8, wherein the ranking threshold is based on user preferences for the native application.

12. The method of claim 1, wherein the background unload event occurs at an expiration of a timeout period measured from the instantiation of the background instances of the native application.

13. The method of claim 1, wherein the background unload event occurs upon an unloading of a page in which the set of search results are displayed.

14. A system, comprising:

a data processing apparatus; and software stored in non-transitory computer readable storage medium storing instructions executable by the data processing apparatus and that upon such execution cause the data processing apparatus to perform operations comprising:

receiving a set of search results, wherein the set includes one or more search results that each include a native application deep link that instantiates an instance of a native application, wherein a native application generates environment instances for display on a user device within the native application, and the native application operates independent of a browser application that operates on the user device;

selecting, prior to a user selection of a search result, one or more native application deep links from the search results;

instantiating, prior to a user selection of a search result, for each native application deep link that is selected, a background instance of the native application to which the native application deep link corresponds;

generating a background unload event;

determining, in response to the generation of the background unload event, background instances of the native applications instantiated from the native application deep links and that were not brought to a foreground instance prior to the generation of the background unload event; and terminating each of the background instances of the native applications instantiated that were not brought to the foreground instance prior to the generation of the background unload event.

15. The system of claim 14, the operations further comprising:

receiving a user selection of a search result with a native application deep link; and determining that the native application to which the native application deep link corresponds has been instantiated in a background instance, and in response causing the native application instantiated in a background instance to transition to a foreground instance.

16. The system of claim 15, the operations further comprising:

generating, for each native application deep link a unique identifier that corresponds to the native application to which the native application deep link corresponds; and wherein instantiating, for each native application deep link that is selected, the background instance of the native application comprises instantiating the background instance using the unique identifier.

17. The system of claim 16, the operations further comprising:

for each native application that support multiple instances of the native application, associate each unique identifier with a corresponding unique instance of the native application.

18. The system of claim 14, wherein selecting, prior to the user selection of a search result, native application deep links from the search results comprise selecting only native application deep links from a proper subset of search results, wherein each search result in the proper subset meets a ranking threshold.

19. The system of claim 18, wherein the ranking threshold is based on a minimum ordinal position of a search result.

20. A computer storage medium encoded with a computer program, the program comprising instructions that when executed by data processing apparatus cause the data processing apparatus to perform operations comprising:

receiving a set of search results, wherein the set includes one or more search results that each include a native application deep link that instantiates an instance of a native application, wherein a native application generates environment instances for display on a user device within the native application, and the native application operates independent of a browser application that operates on the user device;

selecting, prior to a user selection of a search result, one or more native application deep links from the search results;

instantiating, prior to a user selection of a search result, for each native application deep link that is selected, a background instance of the native application to which the native application deep link corresponds;

generating a background unload event;

determining, in response to the generation of the background unload event, background instances of the native applications instantiated from the native application deep links and that were not brought to a foreground instance prior to the occurrence of the background unload event; and terminating each of the background instances of the native applications instantiated that were not brought to the foreground instance prior to the occurrence of the background unload event.

* * * * *

UNITED STATES PATENT AND TRADEMARK OFFICE
CERTIFICATE OF CORRECTION

PATENT NO. : 10,146,842 B2
APPLICATION NO. : 14/945703
DATED : December 4, 2018
INVENTOR(S) : Yeom et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 434 days.

Signed and Sealed this
Twenty-fifth Day of June, 2019

Andrei Iancu
*Director of the United States Patent and Trademark Office*